(12) United States Patent
Mere

(10) Patent No.: US 10,636,313 B2
(45) Date of Patent: Apr. 28, 2020

(54) METHOD AND DEVICE FOR GENERATING AN OPTIMUM VERTICAL PATH INTENDED TO BE FOLLOWED BY AN AIRCRAFT

(71) Applicant: Airbus Operations SAS, Toulouse (FR)

(72) Inventor: Jean-Claude Mere, Verfeil (FR)

(73) Assignee: Airbus Operations SAS, Toulouse (FR)

( * ) Notice: Subject to any disclaimer, the term of this patent is extended or adjusted under 35 U.S.C. 154(b) by 384 days.

(21) Appl. No.: 15/342,203

(22) Filed: Nov. 3, 2016

(65) Prior Publication Data

US 2017/0132942 A1 May 11, 2017

(30) Foreign Application Priority Data

Nov. 5, 2015 (FR) ..................... 15 60600

(51) Int. Cl.
| | |
|---|---|
| *G05D 1/00* | (2006.01) |
| *G08G 5/02* | (2006.01) |
| *G08G 5/00* | (2006.01) |
| *G01C 23/00* | (2006.01) |
| *G01C 21/20* | (2006.01) |
| *G08G 5/04* | (2006.01) |

(52) U.S. Cl.
CPC ............. *G08G 5/025* (2013.01); *G01C 21/20* (2013.01); *G01C 23/00* (2013.01); *G08G 5/0021* (2013.01); *G08G 5/0034* (2013.01); *G08G 5/0047* (2013.01); *G08G 5/045* (2013.01)

(58) Field of Classification Search
CPC .... G08G 5/025; G08G 5/0021; G08G 5/0034; G08G 5/0047; G08G 5/045; G01C 21/20; G01C 23/00

USPC ............................................................ 701/5
See application file for complete search history.

(56) References Cited

U.S. PATENT DOCUMENTS

| | | | | |
|---|---|---|---|---|
| 3,666,929 A | * | 5/1972 | Menn ................... | G05D 1/0676 701/16 |
| 4,792,906 A | * | 12/1988 | King ..................... | G01C 5/005 244/186 |
| 5,957,412 A | * | 9/1999 | Saint Upery ........ | G05D 1/0607 244/180 |

(Continued)

FOREIGN PATENT DOCUMENTS

| | | |
|---|---|---|
| EP | 2463844 | 6/2012 |
| FR | 2993974 | 1/2014 |

OTHER PUBLICATIONS

French Search Report, dated Jul. 5, 2016, priority document.

*Primary Examiner* — Khoi H Tran
*Assistant Examiner* — B M M Hannan
(74) *Attorney, Agent, or Firm* — Greer, Burns & Crain Ltd.

(57) ABSTRACT

A method and device for generating an optimum vertical path intended to be followed by an aircraft. The device comprises at least one database relating to fixed and moving obstacles, a data entering unit, a data processing unit implementing iterative processing to generate an optimum vertical path between an initial state and a final state as a function of flight strategies, that optimum vertical path being generated in such a manner as to be free of any collision with surrounding obstacles and to conform to energy constraints, and a data transmission link for transmitting that optimum vertical path to at least one user system.

11 Claims, 2 Drawing Sheets

(56) References Cited

U.S. PATENT DOCUMENTS

| | | | | |
|---|---|---|---|---|
| 6,266,610 B1* | 7/2001 | Schultz | ............... | G05D 1/101 |
| | | | | 701/528 |
| 8,825,366 B2* | 9/2014 | Giovannini | ......... | G08G 5/0052 |
| | | | | 701/3 |
| 9,536,435 B1* | 1/2017 | Shay | ............... | G08G 5/045 |
| 9,691,287 B1* | 6/2017 | Shapiro | ............... | G06F 3/013 |
| 2002/0183922 A1* | 12/2002 | Tomasi | ............... | G01C 21/20 |
| | | | | 701/533 |
| 2005/0283281 A1* | 12/2005 | Hartmann | ............ | G01C 21/00 |
| | | | | 701/4 |
| 2011/0196549 A1* | 8/2011 | Sharkany | ............ | G01C 23/00 |
| | | | | 701/8 |
| 2012/0059535 A1* | 3/2012 | Jackson | ............... | G05D 1/101 |
| | | | | 701/3 |
| 2012/0143505 A1 | 6/2012 | Giovannini et al. | | |
| 2012/0253562 A1* | 10/2012 | Wachenheim | ....... | G08G 5/0034 |
| | | | | 701/4 |
| 2014/0032095 A1 | 1/2014 | Courteville et al. | | |
| 2014/0039734 A1* | 2/2014 | Ramaiah | ............... | G01W 1/02 |
| | | | | 701/14 |
| 2015/0005992 A1* | 1/2015 | Coulmeau | ............ | G08G 5/025 |
| | | | | 701/16 |
| 2015/0262490 A1* | 9/2015 | Deker | ............... | G08G 5/0052 |
| | | | | 701/3 |
| 2019/0088143 A1* | 3/2019 | Deker | ............... | G08G 5/0021 |

\* cited by examiner

METHOD AND DEVICE FOR GENERATING AN OPTIMUM VERTICAL PATH INTENDED TO BE FOLLOWED BY AN AIRCRAFT

CROSS-REFERENCES TO RELATED APPLICATIONS

This application claims the benefit of the French patent application No. 1560600 filed on Nov. 5, 2015, the entire disclosures of which are incorporated herein by way of reference.

BACKGROUND OF THE INVENTION

The present invention concerns a method and a device for generating at least one optimum vertical path of a flight path intended to be followed by an aircraft, in particular a transport aircraft.

An object of the present invention is more particularly to generate using onboard means and, in real time, an optimized path that is flyable in constrained dynamic environments, that is to say, in environments that are liable to contain objects (or obstacles) which the aircraft must be prevented from colliding with and notably mobile objects such as areas of meteorological disturbance, for example storm areas, or other aircraft.

The present invention applies more particularly, although not exclusively, to approach paths during an approach phase in order to land on a runway of an airport.

It is known that energy management in the descent and approach phase of an aircraft, in particular a transport aircraft, is generally left to the discretion of the crew of the aircraft, who must evaluate the energy situation of the aircraft and take the necessary piloting actions to manage any situations of over-energy or of under-energy of the aircraft. In some situations where the aircraft has been diverted from its reference path, for example for traffic control reasons, the combination of this energy management and modification of the flight plan, which necessitates multiple interactions with the systems of the aircraft, generates a high workload for the crew.

Also, it can happen that the pilot of an aircraft seeking to arrive at a target point mismanages the energy of the aircraft and overshoots that target point, for example arriving at the target point too soon or at too great a height. In the situation where the target point in the approach phase is a so-called stabilization point, the aircraft must then perform a go-around before landing, which wastes time.

SUMMARY OF THE INVENTION

An object of the present invention is to remedy this disadvantage. The present invention concerns a method for generating at least one optimum vertical path of a flight path for an aircraft, in particular a transport aircraft, which is defined in an environment liable to contain obstacles (notably moving obstacles), the flight path comprising the vertical path and a lateral path and being defined between a so-called current state comprising at least one so-called current point and a so-called target state comprising at least one so-called target point, preferably a stabilization point during an approach.

According to the invention, the method comprises a sequence of steps, preferably implemented automatically, the sequence of steps comprising at least:

a generation step, implemented by a generation unit, comprising generating one or more so-called next states from a so-called computation state in a given computation horizon (in terms of flight time or flight distance), each of the next states generated depending on a particular flight strategy, a next state being generated for each of a set of possible flight strategies among a plurality of predetermined flight strategies, each of the next states generated being associated with a path segment defined between the computation state and that next state;

a validation step, implemented by a validation unit, comprising validating the next states generated, by verifying each of the path segments respectively associated with the next states generated relative to obstacles, and retaining only the validated states;

a notation step, implemented by a notation unit, comprising assigning a score to each of the validated states, a score depending on a cost associated with a flight path between an initial state and the validated state concerned, as well as a criterion of closeness between the validated state concerned and a final state; and an identification step, implemented by an identification unit, comprising identifying, among the validated states, the state having the best score, the sequence of steps being implemented in an iterative manner, the state identified in the identification step of a given iteration being used in the next iteration as computation state, the computation state taken into account in the first iteration being a so-called initial state, in which method, concerning the two initial and final states, one of the two states corresponds to the current state of the aircraft and the other of the two states corresponds to the target state, the sequence of steps being implemented until the state identified in the identification step is situated at least at a predetermined proximity to the final state, the vertical path between the initial state and that identified state representing the optimum vertical path generated, the method also comprising a data transmission step, implemented by a data transmission link, comprising transmitting at least the optimum vertical path to at least one user system.

Accordingly, thanks to the present invention, a vertical path is generated in real time that has the following characteristics, as explained in more detail hereinafter:

it is optimized;
it is free of any collision with surrounding obstacles, notably moving obstacles;
it conforms to energy constraints; and
it represents a flight path making it possible to connect the current position (or current point) of the aircraft to a target point defined by an operator, generally the pilot of the aircraft. That target point may correspond to the stabilization point during an approach, for example.

This makes it possible to remedy the aforementioned disadvantage.

In a first embodiment, the initial state corresponds to the current state of the aircraft and the final state corresponds to the target state.

Moreover, in a second embodiment, the initial state corresponds to the target state and the final state corresponds to the current state of the aircraft. In this second embodiment, the computation is therefore implemented in reverse.

A state advantageously comprises a point in space defined by its position (its altitude and its horizontal position), and at least one flight parameter of the aircraft. The flight parameter of the aircraft preferably corresponds to one of the following parameters:
- a speed of the aircraft;
- an engine thrust of the aircraft;
- an airbrake configuration of the aircraft;
- an aerodynamic configuration of the aircraft.

In one particular embodiment, the validation step comprises:
- a computation sub-step comprising determining a protection envelope around the path segment associated with the next state to be validated;
- a comparison sub-step comprising comparing that protection envelope with obstacles, the obstacles comprising at least one of the following types of obstacles: fixed obstacles and moving obstacles; and
- a validation sub-step comprising considering that the next state is validated if no obstacle is found in the protection envelope.

In this case, to perform a validation test on a next state relative to moving obstacles, the comparison sub-step advantageously comprises comparing the protection envelope to extrapolated positions of those moving obstacles.

Moreover, the criterion of closeness (used in the notation step) advantageously comprises at least one of the following parameters:
- an estimated cost for a flight between the next state concerned and the final state;
- at least one difference of values of at least one parameter between the next state concerned and the final state; and
- a priority order between different flight strategies.

Additionally, the possible flight strategies advantageously comprise at least some of the following strategies:
- a descent at constant speed;
- an accelerated/decelerated descent at a given percentage of distribution of energy between potential energy and kinetic energy;
- a descent at constant slope;
- a descent at constant vertical speed;
- a levelling off at constant speed;
- an accelerated/decelerated levelling off;
- a climb at constant speed;
- an accelerated/decelerated climb at a given percentage of distribution of energy between potential energy and kinetic energy;
- a climb at constant slope; and
- a climb at constant vertical speed.

The present invention also concerns a device for generating an optimum vertical path of a flight path for an aircraft, in particular a transport aircraft, which is defined in an environment liable to contain obstacles (notably moving obstacles), the flight path comprising the vertical path and a lateral path and being defined between a so-called current state comprising at least one so-called current point (or current position) and a so-called target state comprising at least one so-called target point (or target position).

According to the invention, the device includes:
- at least one database relating to obstacles;
- a data entering unit;
- a data processing unit implementing iterative processing, the data processing unit comprising:
  - a generation unit configured to generate one or more so-called next states from a so-called computation state in a given computation horizon (in terms of flight time or flight distance), each of the next states generated depending on a particular flight strategy, a next state being generated for each of a set of possible flight strategies among a plurality of predetermined flight strategies, each of the next states generated being associated with a path segment defined between the computation state and that next state, the computation state taken into account in a first iteration being a so-called initial state;
  - a validation unit configured to validate the next states generated, by verifying each of the path segments respectively associated with the next states generated relative to obstacles, and retaining only the validated states;
  - a notation unit configured to assign a score to each of the validated states, a score depending on a cost associated with a flight path between the initial state and the validated state concerned, as well as a criterion of closeness between the validated state concerned and a final state; and
  - an identification unit configured to identify, among the validated states, the state having the best score, the state identified by the identification unit in a given iteration being used if necessary by the generation unit in the next iteration as the computation state,
the data processing unit repeating the iterative processing until the state identified by the identification unit is situated at least at a predetermined proximity to the final state, the vertical path between the initial state and that identified state representing the optimum vertical path generated, one of the two states among the initial state and the final state corresponding to the current state of the aircraft and the other of the two states corresponding to the target state; and
- a data transmission link comprising transmitting at least the optimum vertical path to at least one user system.

In one particular embodiment, the data entering unit includes an information transmission system to enable at least the reception of data received from outside the aircraft.

Moreover, the device advantageously includes, as a user system, a display unit configured to display at least the optimum vertical path.

Additionally, the device advantageously also includes:
- a database of performance of the aircraft; and/or
- a database comprising at least one of the following types of data:
  - data relating to surrounding aircraft;
  - data on noise generated by the aircraft; and
  - data relating to at least one auxiliary criterion to be taken into account.

The present invention also concerns an aircraft, in particular a transport aircraft, that is provided with a device such as that described above.

BRIEF DESCRIPTION OF THE DRAWINGS

The appended figures explain clearly how the invention may be reduced to practice. In these figures, identical references designate similar elements. More particularly.

DETAILED DESCRIPTION OF THE PREFERRED EMBODIMENTS

Figure 1:
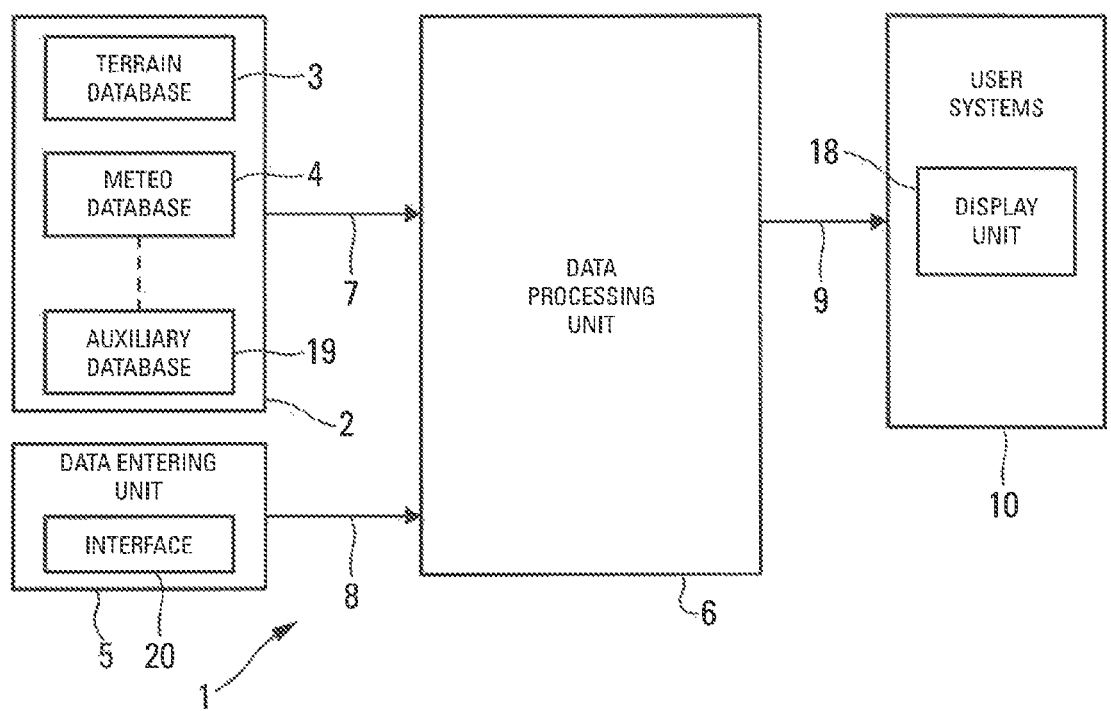
FIG. 1 is a block diagram of one particular embodiment of a device according to the invention.

The device 1 used to illustrate the invention and represented diagrammatically in FIG. 1 has the object of constructing at least one vertical path TV of a flight path intended to be followed by an aircraft AC (FIG. 2), in particular a transport aircraft, in an environment liable to contain obstacles OB1 and OB2 (notably moving obstacles).

Figure 2:
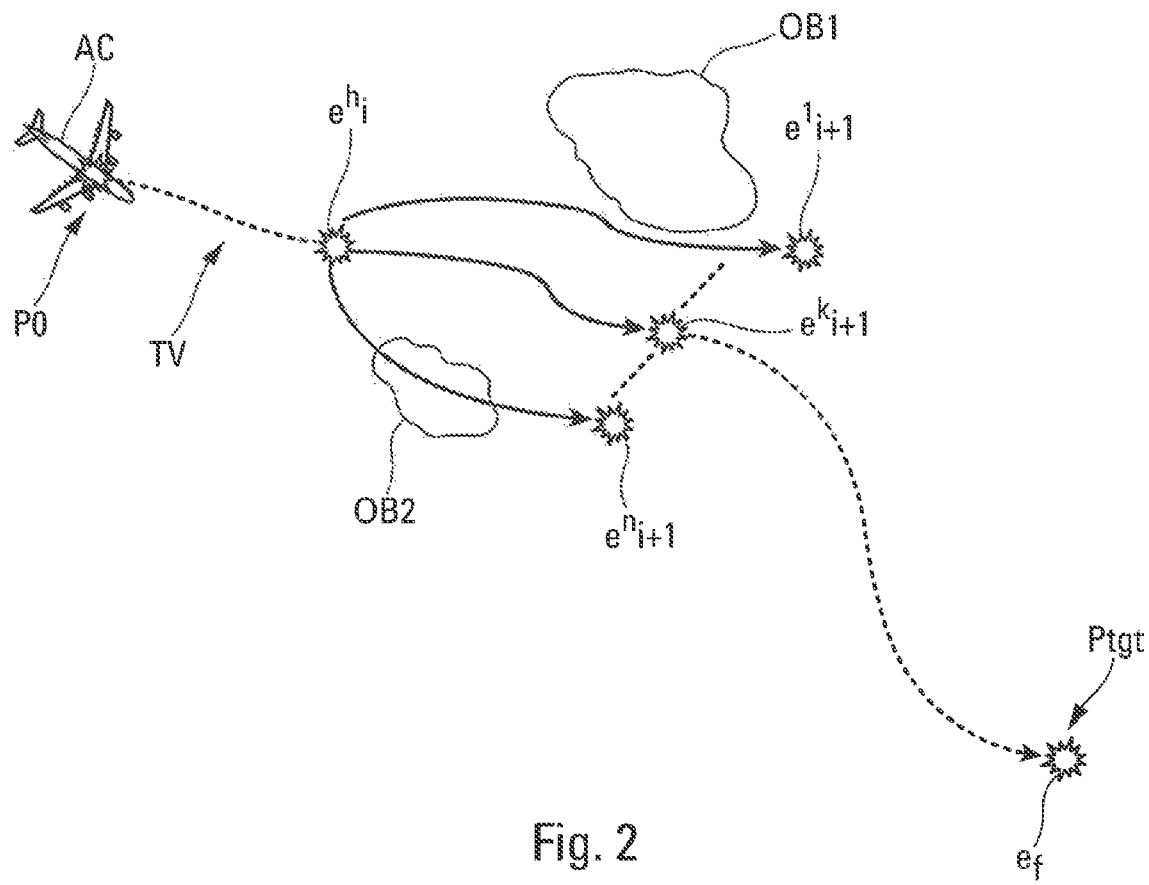
FIG. 2 is a diagrammatic representation explaining the generation according to the invention of an optimum vertical path.

The flight path comprises a lateral (or horizontal) path that is defined in a horizontal plane and a vertical path that is defined in a vertical plane. The flight path connects a current point P0 (corresponding to the current position of the aircraft AC) at which the aircraft AC has a so-called current state to a target point Ptgt at which the aircraft AC has a so-called target state, as represented in FIG. 2.

A state comprises a point in space, for example P0, defined by its altitude and its horizontal position and one or more flight parameters of the aircraft. The flight parameter or parameters that are taken into account preferably comprise one or more of the following parameters:
- a speed of the aircraft;
- an engine thrust of the aircraft;
- an airbrake configuration of the aircraft;
- an aerodynamic configuration of the aircraft.

According to the invention, the device 1, which is onboard the aircraft, includes, as represented in FIG. 1:
- a set 2 of databases comprising at least one database 3, 4 relating to obstacles;
- a data entering unit 5;
- a data processing unit 6 that is connected by respective connections 7 and 8 to the set 2 and to the data entering unit 5 and configured to implement iterative processing with the aim of determining an optimum vertical path; and
- a data transmission link 9 for transmitting at least the optimum vertical path to at least one user system of a set 10 of user systems.

Figure 3:
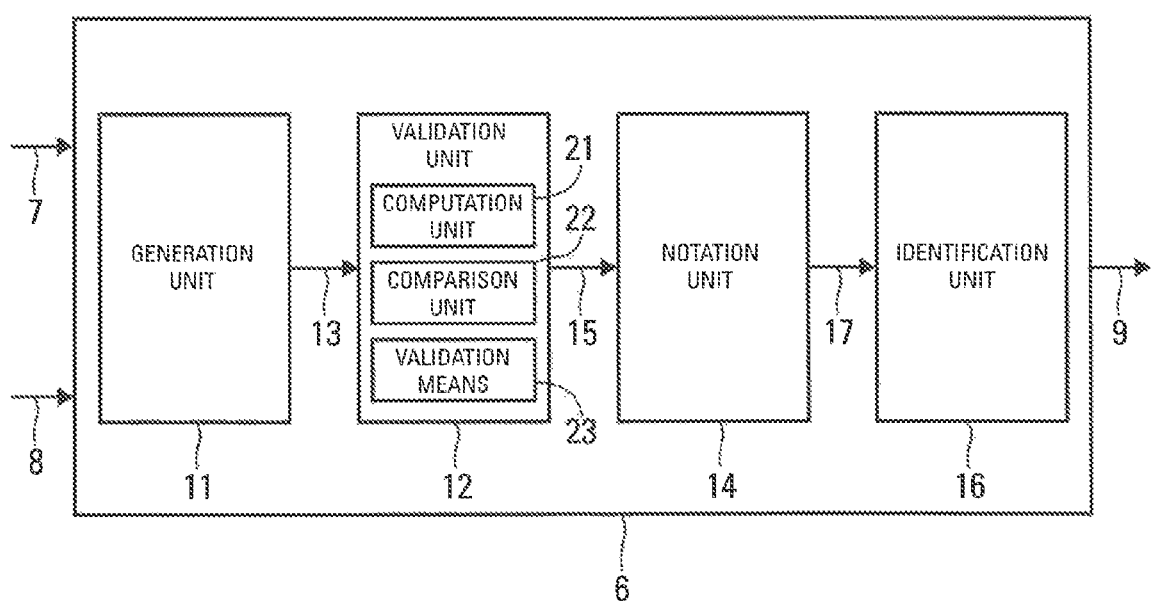
FIG. 3 is a block diagram of a data processing unit of the device from FIG. 1.

The data processing unit (or central processing unit) 6 further includes, as represented in FIG. 3:
- a generation unit 11 configured to generate one or more so-called next states from a so-called computation state of the aircraft in a given (notably predetermined) computation horizon. This computation horizon may correspond to a given flight time or to a given flight distance. Each of the next states generated depends on a particular flight strategy, as explained hereinafter. A next state of this kind is generated for each of a set of possible flight strategies among a plurality of predetermined flight strategies. Each of the next states generated is associated with a path segment defined between the computation state and that next state. Moreover, the computation state taken into account in a first iteration is a so-called initial state. The initial state corresponds either to the current state (at the current point P0) or to the target state (at the target point Ptgt), and the other of the current and target states corresponds to a so-called final state, as explained hereinafter;
- a validation unit 12 connected by a link 13 to the generation unit 11 and configured to validate the states generated by the generation unit 11 by verifying each of the path segments respectively associated with the generated states relative to obstacles and retaining only the validated states.
- a notation unit 14 connected by a link 15 to the validation unit 12 and configured to assign a score to each of the states validated by the validation unit 12; a score depends on a cost associated with a flight path between the initial state and the validated state concerned as well as a criterion of closeness between the validated state concerned and the final state as explained hereinafter; and
- an identification unit 16 connected by a link 17 to the notation unit 14 and configured to identify the validated state having the best score.

In the context of the present invention, the best score is that of the various scores concerned that is associated with a most favorable state for the envisaged transition (notably with a most favorable combination of reduced cost and advantageous criterion of closeness).

If necessary, the state identified by the identification unit 16 in a given iteration is used as the computation state by the generation unit 11 in the next iteration.

The data processing unit 6 repeats the iterative processing implemented by the units 11, 12, 14 and 16 until the state identified by the identification unit 16 is situated at least at a predetermined proximity to the final state. The vertical path between the initial state and the state identified in this way then represents the optimum vertical path generated by the data processing unit 6 of the device 1.

In the context of the present invention, a state is considered to be in the proximity of the final state when the difference between that final state and the state concerned is below a state threshold. That state threshold may be a distance or a combination of criteria participating in the definition of the state (position, speed, flight parameter(s)).

The data processing unit 6 may be a computer connected to a flight management system (FMS) of the aircraft. It may be a module integrated into the FMS or a module sited remotely from the FMS.

Moreover, the data entering unit 5 includes a set of sources of information, such as sensors of the aircraft (meteo (weather) radar for enriching a meteo database, aircraft configuration sensors (yoke, engine speed, gear down, etc.)) or measuring or computation systems.

The data entering unit 5 also includes a human/machine interface 20 enabling an operator, notably the pilot of the aircraft, to enter into the device 1 parameters such as the target point Ptgt and/or one or more criteria used in processing (weather, noise, etc.). This human/machine interface 20 may, as usual, comprise various means, for example a portable keyboard/screen system such as a laptop computer or a tablet, or internal avionic means (cockpit screen, keyboard and trackball, for example).

In one particular embodiment, the data entering unit 5 also includes an information transmission system to enable at least the automatic reception of data received from outside the aircraft.

Moreover, the device 1 notably includes a user system of the set 10 in the form of a display unit 18 configured to display at least the optimum vertical path on a display screen in the cockpit of the aircraft.

The set 10 may also include onboard systems such as an autopilot system, for example, or means for informing air traffic control of the results of the processing carried out (for example via a data transmission link of the usual kind).

Moreover, in one preferred embodiment, the set 2 of databases of the device 1 includes at least:
- a terrain database 3 containing fixed constraints (or obstacles); and
- a meteo database 4 containing mobile constraints (or obstacles). This information may be produced by onboard meteo surveillance or received via a data transmission link of the usual kind.

The set 2 of databases may further include one or more auxiliary databases 19.

The set 2 of databases may preferably comprise an auxiliary database 19 in the form of at least one of the following bases:
- an aircraft performance database making it possible, by interpolation in tables, to estimate a new state of the aircraft (altitude, speed, mass, configuration, etc.) on the basis of a preceding state following the application of a flight strategy;
- a database containing data relating to surrounding aircraft and containing, for example, flight plans and predictions of identified aircraft within a given perimeter;
- a database containing data on the noise generated by the aircraft as a function of various configurations of the aircraft; and
- a database containing data relating to auxiliary criteria that have to be taken into account (such as the NOx level, for example).

The device 1 therefore consults two types of databases:
- a fixed database, representing obstacles, the position of which does not evolve during the flight. This database 3 contains discretized obstacles. The representation is a polygonal projection onto the ground associated with a limit height; and
- dynamic databases representing all moving obstacles (storm cells, aircraft, etc.) that the operator requires the evaluation to take into account. The dynamic databases integrate additional information concerning the evolution of these areas. For storm areas, the information is produced by analysis of the recent evolution of the areas (analysis of meteo surveillance data or of data transmitted via a data transmission link, for example). The meteo database represents a discrete risk area associated with a storm cell detected by meteo surveillance. Each construction point of the risk area is associated with a movement vector calculated from the evolution of the point over the latest minutes of observation.

In addition to information from the databases 3, the device 1 notably uses a set of parameters configured by the pilot (using the interface 20) or left at the default value. The only information that is essential for reducing the invention to practice is the target point Ptgt (that is to say, the point at which the pilot wishes the generated path to terminate). The target state at that target point Ptgt is defined by a geometric position (latitude, longitude, altitude, bearing) and potentially also by ancillary constraints (speed, configuration, etc.). The most usual target point Ptgt in the approach phase is the stabilization point (1000 or sometimes 1500 feet above the altitude of the threshold of the runway at the approach speed).

As a function of the current state of the aircraft (in particular its speed, engine thrust, airbrake configuration (smooth, airbrakes half-deployed, airbrakes fully deployed) and aerodynamic configuration (smooth, conf1, conf2, conf3, conf4 or gear down), the device 1 takes into account some or all of the following flight strategies (notably via the generation unit 11):
- a descent at constant speed;
- an accelerated/decelerated descent at a given percentage of distribution of energy between potential energy and kinetic energy;
- a descent at constant slope;
- a descent at constant vertical speed;
- a levelling off at constant speed;
- an accelerated/decelerated levelling off;
- a climb at constant speed;
- an accelerated/decelerated climb at a given percentage of distribution of energy between potential energy and kinetic energy;
- a climb at constant slope; and
- a climb at constant vertical speed.

To take account of the exclusive character of some flight strategies or of the fact that once a flight strategy is entered it can no longer be changed, as processing proceeds the list of flight strategies that can be envisaged evolves dynamically as a function of the state of the aircraft. For example, if the speed of the aircraft falls below the acceptable limit for using configuration 1, the device 1 adds to the possible flight strategies those that can be envisaged in configuration 1, and thereby enriches the list of successive states of the aircraft with the aim of evaluating if those flight strategies can constitute beneficial solutions for bringing the aircraft to a state close to the required final state.

In one particular embodiment, as represented in FIG. 3, the validation unit 12 includes:
- a computation unit 21 configured to determine a protection envelope around the path segment associated with the state to be validated. The computation unit 21 can generate around the path segment a protection envelope relating to the required navigation performance (RNP). The protection envelope is defined around the path, preferably both in the vertical plane and in the horizontal plane;
- a comparison unit 22 configured to compare this protection envelope with obstacles from the set 2, the obstacles comprising fixed obstacles and/or moving obstacles. To be more precise, the comparison unit 22 verifies the existence of a collision between this protection envelope (not represented) and known obstacles OB1 and OB2 (FIG. 2) that are notably stored in the databases 3 and 4. The detection of collision with the dynamic areas (or moving obstacles) is effected by linear extrapolation of positions based on the vectors stored in the corresponding database; and
- validation means 23 that consider that the evaluated state is validated if there is no obstacle located in the corresponding protection envelope.

Consequently, the device 1, as described above, generates in real time a vertical flight path TV that has the following characteristics:
- it is optimized;
- it is free of any collision with surrounding obstacles OB1 and OB2, including mobile (or dynamic) obstacles, such as a storm cell or an aircraft, which an FMS is not able to guarantee at present;
- it conforms to energy constraints; and
- it makes it possible to connect the current point P0 of the aircraft to a target point Ptgt defined by an operator, generally the pilot of the aircraft.

In a preferred application, the device 1 makes it possible to generate an approach path that takes account of the current energy situation of the aircraft and brings it optimally to an optimum energy situation at the stabilization point of the approach by identifying to the crew the succession of optimum flight strategies making it possible to follow that path.

Figure 4:
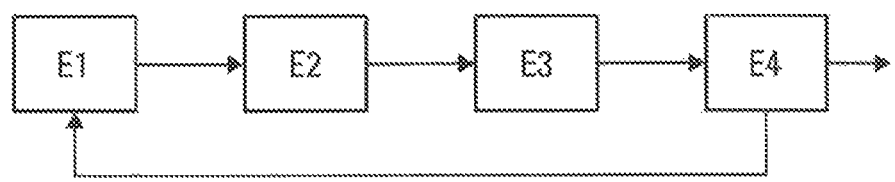
FIG. 4 is a flowchart of successive steps implemented by the device.

The iterative processing performed by the data processing unit 6 of the device 1 comprises a sequence of steps E1 to E4 represented in FIG. 4. This sequence of steps E1 to E4 is implemented automatically and repetitively.

As shown in FIGS. 3 and 4, the sequence of steps comprises:
- a generation step E1 implemented by the generation unit 11 and comprising generating one or more so-called next states from a so-called computation state. Each of the next states is therefore generated as a function of a particular flight strategy and a path segment defined between the computation state and that next state is associated with each of the states generated;
- a validation step E2 implemented by the validation unit 12 and comprising validating the next states generated by verifying each of the associated path segments and retaining only the validated states;
- a notation step E3 implemented by a notation unit 14 and comprising assigning a score to each of the validated states; and
- an identification step E4 implemented by the identification unit 16 and comprising identifying the validated state having the best score. The generation step E1 uses the state identified in this identification step E4 in a given iteration i as the computation state in the next iteration i+1.

This sequence of steps E1 to E4 is executed iteratively until the state identified in the identification step E4 is situated at least within a predetermined proximity to the final state. The vertical path between the initial state and this identified state as then obtained represents the optimum vertical path generated.

The method used by the device 1 (and notably the aforementioned iterative processing) has the following advantages in particular:
- a capacity to generate the optimum vertical path without using complex optimization techniques (as usually employed). It can rely on processing already used in the flight management system to seek the optimum path among all the flyable paths of the aircraft, which avoids adding the mathematical complexity of the usual optimization methods to the processing envisaged;
- its application to energy management and multicriteria optimization of the approach path of an aircraft;
- generating the path taking into account of all the operational constraints on the operation of an aircraft; and
- rapid generation of the vertical path.

The search carried out by the data processing unit 6 can take into account the usual path computations executed by the FMS to propagate the state of the aircraft from point to point (with integration of the equations of the mechanics of the flight). Instead of this or in addition to this, to lighten the computations and to accelerate convergence, the data processor unit 6 can use preloaded performance tables.

The device 1 discretizes the vertical space considering path segments obtained by the application of different vertical flight strategies that may be envisaged.

The method generates and supplies to user systems an optimum path free of obstacles and conforming to operational constraints. This optimum path can notably be displayed on an onboard screen or transmitted to an air traffic controller. It can also be used as a reference for automatic guidance.

The steps E1 to E4 referred to above are described in more detail hereinafter.

In the step E1, as a function of the current state of the aircraft (mass, speed, engine thrust, configuration, etc.), the local atmosphere (wind, temperature, etc.) and above all the flight strategy concerned (descent at constant speed, descent at constant vertical speed, levelling off, etc.), the generation unit 11 generates a new state of the aircraft in a given horizon (in terms of time or distance). This processing is repeated for each flight strategy that may be envisaged, which makes it possible to determine all of the possible states that the aircraft is liable to assume at the next moment.

By way of illustration, there has been represented in FIG. 2 a computation state for an iteration i, designated $e_i^h$, and the possible states in the next iteration i+1. The set of these possible next states of the aircraft is $\{e_{i+1}^1, \ldots, e_{i+1}^k, \ldots, e_{i+1}^n\}$, k and n being integers and k varying from 1 to n. The n strategies $\{s1\ i\text{->}i+1, \ldots, sk\ i\text{->}i+1, \ldots, sn\ i\text{->}i+1\}$ that may be envisaged for going from the computation state $e_i^h$ to the next states $\{e_{i+1}^1, \ldots, e_{i+1}^k, \ldots, e_{i+1}^n\}$, respectively, are considered.

In the step E2, the validation unit 12 analyzes each of the path segments respectively associated with the states $\{e_{i+1}^1, \ldots, e_{i+1}^k, \ldots, e_{i+1}^n\}$, that is to say which are defined between the computation state $e_i^h$ and each of these states $\{e_{i+1}^1, \ldots, e_{i+1}^k, \ldots, e_{i+1}^n\}$. A validation unit 12 evaluates these path segments relative to various (fixed and mobile) obstacles OB1, OB2 and retains only the validated states. In the FIG. 2 example, the state $e_{i+1}^n$ associated with the path segment that goes through the obstacle OB2 is not validated.

In the step E3, the notation unit 14 assigns a score to each state validated by the validation unit 12. As indicated above, a score depends on a cost associated with a flight path between the initial state and the validated state concerned as well as a criterion of closeness between the validated state concerned and the final state.

The cost of transition between two states is calculated by the notation unit 14 by integration (in the same way as the flight management system performs its predictions) or by interpolation in tables. This cost may be more or less complete or may vary as a function of the required optimization. For example, it may be a question of minimizing only the flight time, minimizing only the fuel consumption or via a cost index finding the best compromise between the flight time and the quantity of fuel consumed.

The notation unit 14 can also take into account a cost based on the noise generated (provided that there is an onboard database that makes it possible to estimate the noise produced on the ground for each possible flight strategy) if it is required to minimize the sound impact of the path on populations around the destination airport or a cost based on minimizing the production of NOx or on overcosts linked to a delay (passenger compensation).

In the FIG. 2 example, to the transition sk i->i+1 there corresponds the cost Ck i->i+1 which may be the cost of the fuel consumed, the cost of the flight time (taking into account the meteorological conditions), the noise generated or the quantity of NOx released on the path between the states ehi and eki+1. At least one of the possible costs that will be used by the device 1 is chosen by a pilot via the human/machine interface 20.

The notation unit 14 also takes into account a criterion of closeness. This criterion of closeness may be defined as a function Hi+1->f for each state eki+1. This function Hi+1->f makes it possible to characterize the distance of the state eki+1 from the final state ef. This function Hi+1->f may be a combination of the estimated residual cost between the two states, their distance (purely longitudinal distance or 2D or 3D distance), the speed or energy difference (for the aircraft to converge in terms of altitude and speed at the same time) between the two states, and can downgrade the strategies of lowest priority relative to the others.

Accordingly, for each state ei+1, the computation of a magnitude (or score) Gi+1=ΣCkx->x+1+Hi+1->f, x varying from 1 to i, by the notation unit 14, enables the identification unit 16 to classify the possible values between one another, in the step E4, and to assign preference to the state with the lowest value of G to continue the computation, that state corresponding to the path that minimizes the cost up to ei and that is estimated as the closest to the final state ef.

The notation unit 14 preferably evaluates the criterion of closeness in such a manner as to give preference to the solution that brings the aircraft into the state closest to the final state. This criterion may represent an evaluation of the cost of the transition between the new state and the final state. Other types of criteria may be used if it is required to orient the search toward particular solutions. For example, in the approach situation, the requirement may be to give preference to a state which is such that the altitude difference (for the aircraft to descend rapidly) and/or the speed difference (so that it slows down rapidly) with the final point are minimum. Moreover, there may be included in the criterion of closeness considerations of priority between different flight strategies so that some of them are envisaged only as a last resort if the others do not make it possible to reach the final point. However, the closer this criterion is to the real cost of the transition between the new state and the final state, the faster the convergence guaranteeing that the solution is the optimum. For example, preferred method may evaluate the cost of the transition to the final state by envisaging the flight strategy that has a linear gradient of energy dissipation close to the residual gradient in the current state (ratio between the residual energy difference to be dissipated and the distance to the final point) and by giving preference to the state for which this cost estimate is minimum.

Thus the data processing unit 6 progressively discretizes the space situated between the current point P0 of the aircraft AC and the final point Pf (notably the stabilization point of an approach) by defining an array of possible states of the aircraft depending on the various flight strategies that may be envisaged, each transition between states representing a flyable path to which there corresponds a cost.

The data processing unit 6 employs iterative processing that comprises analyzing all possible states from the current position of the aircraft and classifying them in increasing order to continue to propagate the state of the aircraft to the final point Pf where it is deemed to be stabilized in the case of an approach for landing.

The data processing unit 6 halts the iteration when an optimum path has been identified that makes it possible to reach the final point.

The data processing unit 6 retains all the successive states of the aircraft and therefore the optimum combination of the various flight strategies that may be envisaged to dissipate the energy of the aircraft between its computation state and the final state while avoiding prohibited areas or risk areas for the aircraft. The solution is identified rapidly in that the search is oriented at all times so that the state of the aircraft converges toward the required final state as quickly as possible.

For example, the objective being to converge in terms of energy over the residual distance to the final point, the data processing unit 6 also seeks to give preference to states for which the available flight strategies make it possible to absorb the energy difference (speed and/or altitude difference) as uniformly as possible for example (energy dissipation gradient close to the ratio of the residual energy to the distance to the final point). In a variant embodiment, the device 1 may use a parameterable evaluation function to choose a solution that favors one dissipation strategy over the others at a given time or as a function of a particular situation (for example dissipation of the entire speed difference first, then dissipation of the altitude difference in a uniform manner over the remaining distance, which proves a more effective strategy in some over-energy situations, the aircraft having a higher rate of descent at low speed).

In a first embodiment, the initial state taken into account by the data processing unit corresponds to the current state of the aircraft at the current point P0 as represented in FIG. 2 and the final state taken into account by the data processing unit corresponds to the target state at the target point Ptgt. Propagation is therefore effected in the direction of flight in this first embodiment.

Conversely, in a second preferred embodiment the initial state taken into account by the data processing unit corresponds to the target state (target point Ptgt) and the final state taken into account by the data processing unit corresponds to the current state (current point P0).

In this preferred embodiment, the data processing unit 6 therefore carries out the search in reverse, starting from the final point Pf (FIG. 2), for example the (fixed) stabilization point, and propagating the state of the aircraft toward the state closest to its current state (at the current point P0). It is therefore certain that the vertical path generated will pass through the final point Pf and even if it does not start precisely from the current state of the aircraft the difference can be easily corrected by the guidance system.

Moreover, to accelerate convergence, an evaluation of any conflicts with the environment of the path joining each possible state with the final state in such a manner as to orient the search with priority given to the directions free of environmental constraints may be included in the criterion of closeness (characteristic of the future transition between the new state and the final state), making it possible to order the possible next states to give preference to those that seem most pertinent.

The flight path including the optimum vertical path (therefore generated by the data processor unit 6) and a lateral path is supplied to user systems. It may notably be displayed by means of the display unit or transmitted to an air traffic controller. It may equally be used as a reference for automatic guidance.

The method described above may moreover be combined with a method of the usual kind for generating an optimum lateral path to obtain an optimized 4D flight path.

The device 1, as described above, notably has the following advantages:

it makes it possible to support the crew in its onboard decision-making. Automatic path generation aims to reduce the workload of the crew under onboard situations deemed complex. These situations are associated with a high workload on the pilot, notably caused by a change of environment (change of runway in the approach phase, for example). Automatic path generation then comes into play, handling the reflection associated with the decision-making concerning the path, the pilot intervening as the operator of the function and to validate the result;
 it makes it possible to validate a vertical path. Path generation takes simultaneously into account a plurality of constraints (terrain, energy, flight physics, etc.). Pilots may call on the generation method to validate a path that they wish to follow (but of whose validity they cannot be sure because the environment is too complex); and
 it makes it possible to produce a vertical path that systematically passes through the aircraft and that is the optimum, for display on onboard screens and possibly for transmission to air traffic control for agreement. This vertical path may be used as a reference and coupled to a guidance computer for automatic tracking (slaving the position of the aircraft to this path). Unlike the current situation in which the flight management system fixes the reference path and attempts to maintain the aircraft on that path via DES (descent) or APP (approach) guidance modes, leaving it to the pilot to manage over-energy situations by means of the airbrakes or the anticipated deployment of configurations (leading edge slats/flaps/gear), the device 1 continuously updates the path on the basis of the optimum combination of the various flight strategies that may be envisaged to dissipate the energy of the aircraft between its current state and the stabilization point of the approach.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating at least one optimum vertical path of a flight path for an aircraft, the flight path comprising the vertical path and a lateral path and being defined between a current state comprising at least one current point and a target state comprising at least one target point, comprising the steps:

data entering, implemented by a data entering unit, comprises obtaining necessary data for generating at least one optimum vertical path from at least one source, with one source being sensors on the aircraft;

generating, implemented by a generation unit, one or more next states from a computation state in a given computation horizon, each of the next states generated depending on a particular flight strategy, a next state being generated for each of a set of possible flight strategies among a plurality of predetermined flight strategies, each of the next states generated being associated with a path segment defined between the computation state and that next state, wherein the particular strategy comprises at least one selected from the group of:
a descent at constant speed;
an accelerated/decelerated descent at a given percentage of distribution of energy between potential energy and kinetic energy;
a descent at constant slope;
a descent at constant vertical speed;
a levelling off at constant speed;
an accelerated/decelerated levelling off;
a climb at constant speed;
an accelerated/decelerated climb at a given percentage of distribution of energy between potential energy and kinetic energy;
a climb at constant slope; and
a climb at constant vertical speed;

validating, implemented by a validation unit, the next states generated, by verifying each of the path segments respectively associated with the next states generated relative to obstacles, and retaining only the validated states;

notating, implemented by a notation unit, by assigning a score to each of the validated states, the score depending on a cost associated with a flight path between an initial state and the validated state concerned, as well as a criterion of closeness between the validated state concerned and a final state, wherein the criterion of closeness comprises the difference between that final state and the validated state concerned being below a state threshold; and identifying, implemented by an identification unit, among the validated states, the state having the best score, the sequence of steps being implemented in an iterative manner, the state identified in the identification step of a given iteration being used in the next iteration as computation state, the computation state taken into account in the first iteration being the initial state, in which method, concerning the two initial and final states, one of the two states corresponds to the current state of the aircraft and the other of the two states corresponds to the target state, the sequence of steps being implemented until the state identified in the identification step is situated at least at a predetermined proximity to the final state, the vertical path between the initial state and that identified state representing the optimum vertical path generated, and transmitting data, implemented by a data transmission link, comprising transmitting at least said optimum vertical path to at least one user system, wherein the initial state corresponds to said target state and the final state corresponds to said current state of the aircraft, and wherein each state comprises a point in space defined by its altitude and its horizontal position and at least one flight parameter of the aircraft, wherein said flight parameter of the aircraft corresponds to an engine thrust of the aircraft, or an airbrake configuration of the aircraft.

2. The method according to claim 1, wherein the validation step comprises:

a computation sub-step comprising determining a protection envelope around the path segment associated with the next state to be validated;

a comparison sub-step comprising comparing that protection envelope with obstacles, said obstacles comprising at least one of the following types of obstacles: fixed obstacles and moving obstacles; and a validation sub-step comprising considering that said next state is validated if no obstacle is found in said protection envelope.

3. The method according to claim 2, wherein, to perform a validation test on a next state relative to moving obstacles, the comparison sub-step comprises comparing the protection envelope to extrapolated positions of those moving obstacles.

4. The method according to claim 1, wherein said criterion of closeness used in the notation step comprises at least one of the following parameters:

an estimated cost for a flight between the next state concerned and the final state;

at least one difference of values of at least one parameter between the next state concerned and the final state; and a priority order between different flight strategies.

5. A device for generating at least one optimum vertical path of a flight path for an aircraft, the flight path comprising the vertical path and a lateral path and being defined between a current state comprising at least one current point and a target state comprising at least one target point, comprising:

at least one database relating to obstacles;

a database of performance of the aircraft;

a data entering unit, comprising an information transmission system to enable at least the reception of data received from outside the aircraft via sensors on the aircraft;

a data processing unit implementing iterative processing, the data processing unit comprising:

a generation unit configured to generate one or more next states from a computation state in a given computation horizon, each of the next states generated depending on a particular flight strategy, a next state being generated for each of a set of possible flight strategies among a plurality of predetermined flight strategies, each of the next states generated being associated with a path segment defined between the computation state and that next state, the computation state taken into account in a first iteration being a so-called initial state, wherein the particular flight strategy comprises at least one selected from the group of:

a descent at constant speed;

an accelerated/decelerated descent at a given percentage of distribution of energy between potential energy and kinetic energy;

a descent at constant slope;

a descent at constant vertical speed;

a levelling off at constant speed;

an accelerated/decelerated levelling off;

a climb at constant speed;

an accelerated/decelerated climb at a given percentage of distribution of energy between potential energy and kinetic energy;

a climb at constant slope; and a climb at constant vertical speed;

a validation unit configured to validate the next states generated, by verifying each of the path segments respectively associated with the next states generated relative to obstacles, and retaining only the validated states;

a notation unit configured to assign a score to each of the validated states, the score depending on a cost associated with a flight path between the initial state and the validated state concerned, as well as a criterion of closeness between the validated state concerned and a final state, wherein the criterion of closeness comprises the difference between that final state and the validated state concerned being below a state threshold; and an identification unit configured to identify, among the validated states, the state having the best score, the state identified by the identification unit in a given iteration being used if necessary by the generation unit in the next iteration as the computation state, the data processing unit repeating the iterative processing until the state identified by the identification unit is situated at least at a predetermined proximity to the final state, the vertical path between the initial state and that identified state representing the optimum vertical path generated, one of the two states among the initial state and the final state corresponding to said current state of the aircraft and the other of said two states corresponding to said target state; and a data transmission link comprising transmitting at least said optimum vertical path to at least one user system, and, wherein each state comprises a point in space defined by its altitude and its horizontal position and at least one flight parameter of the aircraft, wherein said flight parameter of the aircraft corresponds to an engine thrust of the aircraft, or an airbrake configuration of the aircraft.

6. The device according to claim 5, further comprising, as a user system, a display unit configured to display at least said optimum vertical path.

7. The device according to claim 5, further comprising at least one database comprising at least one of the following types of data:

data relating to surrounding aircraft;

data on noise generated by the aircraft; and data relating to at least one auxiliary criterion to be taken into account.

8. A method for generating at least one optimum vertical path of a flight path for an aircraft, the flight path comprising the vertical path and a lateral path and being defined between a current state comprising at least one current point and a target state comprising at least one target point, comprising the steps:

data entering, implemented by a data entering unit, comprises obtaining necessary data for generating at least one optimum vertical path from at least one source, with one source being sensors on the aircraft;

generating, implemented by a generation unit, one or more next states from a computation state in a given computation horizon, each of the next states generated depending on a particular flight strategy, a next state being generated for each of a set of possible flight strategies among a plurality of predetermined flight strategies, each of the next states generated being associated with a path segment defined between the computation state and that next state, wherein the particular flight strategy comprises at least one selected from the group of;

a descent at constant speed;

an accelerated/decelerated descent at a given percentage of distribution of energy between potential energy and kinetic energy;

a descent at constant slope;

a descent at constant vertical speed;

a levelling off at constant speed;

an accelerated/decelerated levelling off;

a climb at constant speed;

an accelerated/decelerated climb at a given percentage of distribution of energy between potential energy and kinetic energy;

a climb at constant slope; and a climb at constant vertical speed;

validating, implemented by a validation unit, the next states generated, by verifying each of the path segments respectively associated with the next states generated relative to obstacles, and retaining only the validated states;

notating, implemented by a notation unit, by assigning a score to each of the validated states, the score depending on a cost associated with a flight path between an initial state and the validated state concerned, as well as a criterion of closeness between the validated state concerned and a final state, wherein the criterion of closeness comprises the difference between that final state and the validated state concerned being below a state threshold; and identifying, implemented by an identification unit, among the validated states, the state having the best score, the sequence of steps being implemented in an iterative manner, the state identified in the identification step of a given iteration being used in the next iteration as computation state, the computation state taken into account in the first iteration being the initial state, in which method, concerning the two initial and final states, one of the two states corresponds to the current state of the aircraft and the other of the two states corresponds to the target state, the sequence of steps being implemented until the state identified in the identification step is situated at least at a predetermined proximity to the final state, the vertical path between the initial state and that identified state representing the optimum vertical path generated, and transmitting data, implemented by a data transmission link, comprising transmitting at least said optimum vertical path to at least one user system, and wherein each state comprises a point in space defined by its altitude and its horizontal position and at least one flight parameter of the aircraft, wherein said flight parameter of the aircraft corresponds to an engine thrust of the aircraft, or an airbrake configuration of the aircraft.

9. The method according to claim 8, wherein the validation step comprises:

a computation sub-step comprising determining a protection envelope around the path segment associated with the next state to be validated;

a comparison sub-step comprising comparing that protection envelope with obstacles, said obstacles comprising at least one of the following types of obstacles: fixed obstacles and moving obstacles; and a validation sub-step comprising considering that said next state is validated if no obstacle is found in said protection envelope.

10. The method according to claim 9, wherein, to perform a validation test on a next state relative to moving obstacles, the comparison sub-step comprises comparing the protection envelope to extrapolated positions of those moving obstacles.

11. The method according to claim 8, wherein said criterion of closeness used in the notation step comprises at least one of the following parameters:

an estimated cost for a flight between the next state concerned and the final state;

at least one difference of values of at least one parameter between the next state concerned and the final state; and a priority order between different flight strategies.

* * * * *